United States Patent [19]

Leiber

[11] Patent Number: 4,813,448

[45] Date of Patent: Mar. 21, 1989

[54] CONTROL SYSTEM FOR VEHICLE REGULATION

[75] Inventor: Heinz Leiber, Oberriexingen, Fed. Rep. of Germany

[73] Assignee: Robert Bosch GmbH, Stuttgart, Fed. Rep. of Germany

[21] Appl. No.: 526,238

[22] Filed: Aug. 25, 1983

[30] Foreign Application Priority Data

Oct. 2, 1982 [DE] Fed. Rep. of Germany ....... 3236535

[51] Int. Cl.$^4$ .............................................. F16K 31/10
[52] U.S. Cl. .................................. 137/487.5; 303/113
[58] Field of Search ...................... 303/113; 137/487.5

[56] References Cited

U.S. PATENT DOCUMENTS

| 2,753,017 | 7/1956 | Curl et al. | 303/113 X |
| 3,506,958 | 4/1970 | Kawabe | 303/113 X |
| 3,617,099 | 11/1971 | Sugiyama et al. | 303/92 X |
| 3,895,883 | 7/1975 | Pedersen | 416/61 |
| 3,934,941 | 1/1976 | Holmes | 303/113 |
| 3,969,002 | 7/1976 | Jovick | 303/113 |
| 4,292,614 | 9/1981 | Ono et al. | 335/132 X |
| 4,314,165 | 2/1982 | Noddings et al. | 307/310 |
| 4,381,850 | 5/1983 | Grant | 236/49 X |

Primary Examiner—Samuel Scott
Assistant Examiner—Carl D. Price
Attorney, Agent, or Firm—Edwin E. Greigg

[57] ABSTRACT

An open- or closed-loop control system is proposed, having at least one measuring transducer, an evaluation circuit connected with this transducer and at least one magnetic valve, which is incorporated in a hydraulic or pneumatic actuation system. The evaluation circuit and the electromagnet of the magnetic valve to be triggered by it are accommodated in a common housing; the valve or valves are accommodated in a separate block, and the housing is secured thereto. The valves are switched via one or more push rods leading out of the housing and displaceable by one or more electromagnets.

10 Claims, 1 Drawing Sheet

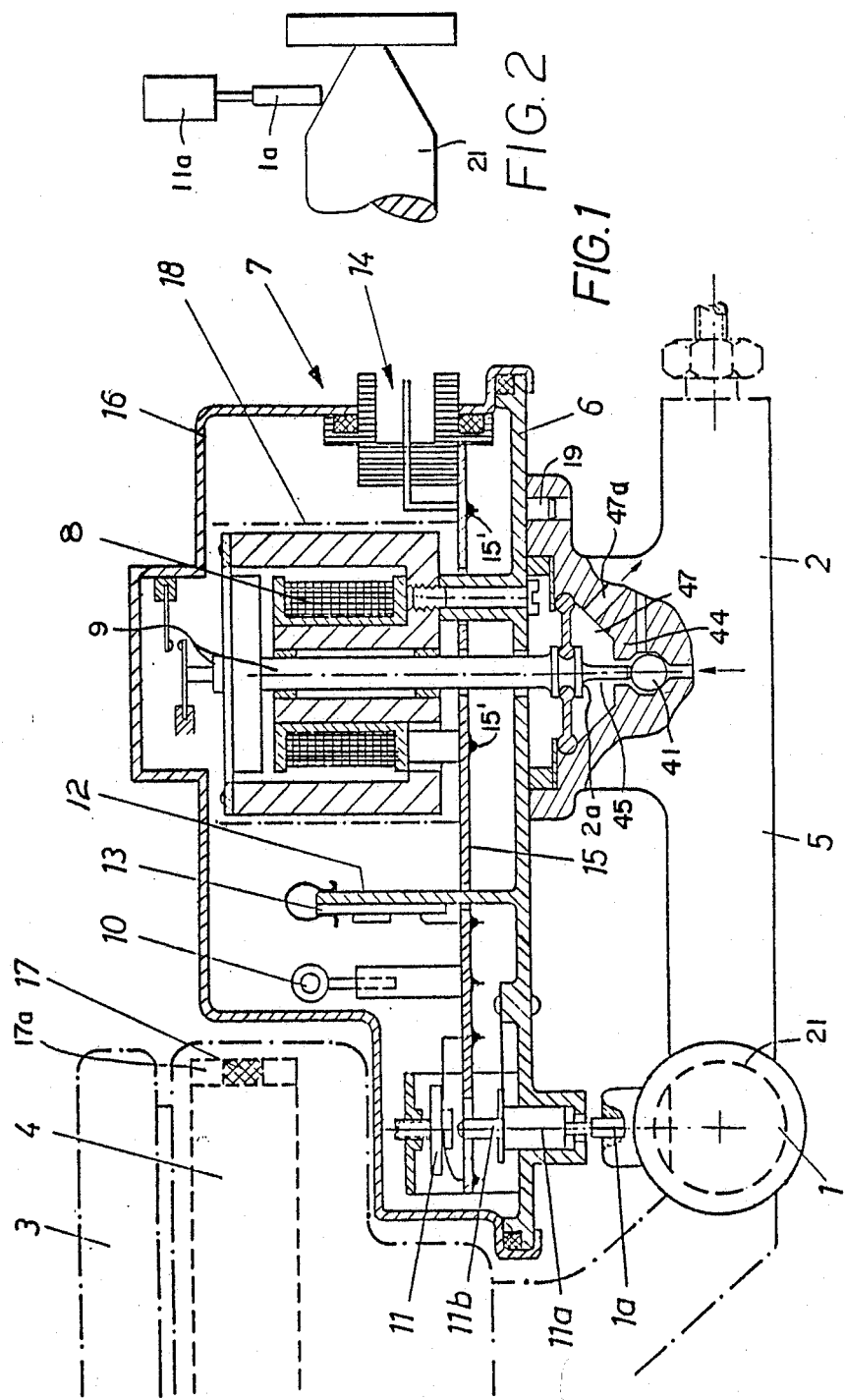

CONTROL SYSTEM FOR VEHICLE REGULATION

BACKGROUND OF THE INVENTION

The invention relates to an open- or closed-loop control system of the general type having at least one transistor for control commands and/or measurement values, an electronic evaluation circuit for the transducer signals and at least one magnetic valve which is triggered by this electronic evaluation circuit disposed near it and is incorporated into a hydraulic or pneumatic actuation system.

In anti-skid or anti-lock regulating systems for vehicles, for instance, it is known to accommodate the evaluation circuit in the passenger compartment, while the sensors assigned to the wheels and the actuation valves for varying the braking pressure are connected with the evaluation circuit via cables and one or two plugs. It is also known to dispose the evaluation circuit in the vicinity of the actuation valves. However, the same number of plug connections must be provided even so, and such connections represent a source of possible errors. These considerations apply to other open- or closed-loop control units as well.

OBJECT AND SUMMARY OF THE INVENTION

In comparison with the prior art, the control system according to the invention has the advantage that at least some of the contact points are eliminated. A further advantage is the savings in expenditure for the housing and for a holder therefor realized by combining these contact points.

In accordance with a further development of the invention, measurement transducers are, as much as possible, accommodated in the housing as well. This is easily accomplished, for instance, in the case of transducers for measuring longitudinal or transverse accelerations of the vehicle. However, even position transducers such as fill level meters or transducers for determining the position of actuating or measuring pistons can be accommodated in the housing if either the position or a change in position is transmitted into the housing to the actual transducer via push rods or if the position or change in position is signalled or transmitted to the actual transducer located in the housing by means of a magnet which moves in coupled fashion with such pistons.

Preferably the common housing has a base body, in particular of metal, which is mounted on the block and in which the electromagnets and perhaps transistors are secured. At least one circuit board is also secured on the block, serving to connect the components, such as relays, located in the housing. Ribs are preferably provided on the base body as well; either they carry the evaluation circuit (which may be embodied as a hybrid module) or the necessary power transistors are attached to them. As a result of this embodiment, good dissipation of heat for all the components is assured. The adjusting magnet or magnets may be surrounded by a covering hood, which serves the purpose of heat dissipation and/or magnetic shielding.

The embodiment according to the invention having a hydraulic brake amplifier combined with an anti-skid regulating system and an integration of these elements is of particular importance.

The invention will be better understood and further objects and advantages thereof will become more apparent from the ensuing detailed description of a preferred embodiment taken in conjunction with the drawing.

BRIEF DESCRIPTION OF THE DRAWING

FIG. 1 shows an exemplary embodiment of the invention; and

FIG. 2 illustrates the relationship of a pushrod and a piston of the brake force amplifier.

DESCRIPTION OF THE PREFERRED EMBODIMENT

The drawing shows a brake force amplifier 1 of a motor vehicle, with a valve block 2 mounted laterally thereon, the valves 41 which are used for anti-skid regulation. The cap of the supply container for brake fluid is marked 3, while the supply container itself is marked 4.

A base plate 6 of a housing 7 is mounted on a flange 5 of the valve block 2. An electromagnet 8 having an armature push rod 9 and position transducers 10 and 11 are disposed in the housing 7 and secured to the base plate 6. An evaluation circuit of a design known per se and here designated as a hybrid module 13 is secured on a rib 12. Measurement transducers for vehicle wheel speed are connectable to a plug connection 14. The connections between the individual components on the base plate 6 are established by means of the conductor tracks of a printed circuit board 15. Corresponding solder connections are marked 15'.

The armature push rod 9 is mechanically connected with a valve push rod 2a, which extends into the valve block 2 to control valve 41. When the electromagnet 8 is in the rest position, the inlet from the pressure source and the consumer shown by the arrow 46 is closed and the pressure at the consumer is reduced by way of the opening for the passageway of the auxiliary rod 2a through the aperture wall 44 and the connection of the intermediate pressure chamber 47 with the low-pressure chamber 47a and when excited the push rod 9 actuates the valve. The valves accommodated in block 2 may, for instance, be designed like the valves of U.S. Pat. No. 4,286,626 and disposed in the block in such a manner that the push rods 9 and 2a actuate the valve body. A push rod 1a protrudes out of the brake force amplifier 1, being disposed via a bevelled edge of a piston 21, for instance. The brake amplifier 1 may, for instance, be embodied like the brake amplifier of FIG. 1 of U.S. Pat. No. 4,143,514 wherein the push rod 1a can be actuated similarly to the push rod 52 shown in this patent by means of the oblique edge of a piston. This push rod 1a is connected with a push rod 11a supported in the base plate 6, and the push rod 11a carries a permanent magnet 11b at its end and as a result generates various signals depending on its nearness to or remoteness from the position transducer 11 (for instance, a Hall element). The position transducer 10 is influenced, through a cap 16, by a permanent magnet 17, which is intended to be connected with the float of the supply container and is moved thereby. At a corresponding position of this magnet 17, the transducer 10 (for instance, a Reed contact) generates a signal.

Wheel speed signals arriving via the plug connection 14 are transmitted via the conductors of the circuit board 15 to the evaluation circuit 13, where in case of locking danger of the wheels they are evaluated and converted into control commands for the electromagnet 8 and any further electromagnets and delivered to the electromagnet or electromagnets via the conductors of the circuit board 15 as known per se. The result is that a valve (41) in block 2 is actuated.

Via the displacement transducer 11 which is actuated in dependence on the pressure of the pressure source, it is signaled to the evaluation circuit—again transmitted via the circuit board—that for instance the pressure of the pressure source (pump and reservoir) of the brake system is no longer furnishing sufficient pressure; the anti-skid regulating system, for instance, is then shut off, via a safety relay not shown but accommodated on the plate 6.

A drop in the supply of brake fluid in the container 4 can also trigger a shutoff of this kind or initiate a warning, by means of a corresponding signal of the transducer 10.

The structure and the operation of anti-skid braking systems in which, upon a tendency toward skidding, valves are actuated are known and need not be explained here. It is known, however, to shut off the action of the anti-skid braking system, for instance via a safety relay, if specified abnormal states exist. The drop in pressure (transducer 11) and/or the decrease in the brake fluid (transducer 10) have been explained here as examples of such a shutoff.

The drawing also shows a covering hood 18 for the electromagnet 8, which may serve the purpose of heat dissipation and shielding.

When the housing 6, 16 is assembled, the flange 5 of the valve block 2 serves as the reference surface. During assembly, a specific distance must be established between the bottom of the plate 6 and the upper end of the brake force amplifier. The electromagnet 8 can then be adjusted in its turn. In order to prevent different systems from being mistaken for one another, a coding pin 19 can be provided on the housing 6/16, while a corresponding opening is provided in the block 2.

The foregoing relates to a preferred exemplary embodiment of the invention, it being understood that other variants and embodiments thereof are possible within the spirit and scope of the invention, the latter being defined by the appended claims.

What is claimed and desired to be secured by Letters Patent of the United States is:

1. A control system containing at least one position transducer, an electronic evaluation circuit for the transducer signals and at least one electromagnetic valve having an electromagnetic portion and a valve element portion which is triggered by said electronic evaluation circuit and is incorporated into a fluid actuation system, wherein said evaluation circuit is disposed in the vicinity of said electromagnetic valve, the improvement comprising a common housing for supporting said evaluation circuit and said electromagnetic portion of said at least one electromagnetic valve, said valve element portion of said at least one electromagnetic valve being accommodated in a valve block means separate from said housing, said common housing being mounted on said valve block means, said valve element portion of said at least one electromagnetic valve being actuatable via at least one push rod extending from said common housing, said at least one push rod being displaceable by said electromagnetic valve, and said at least one position transducer is positioned in said housing.

2. A control system as defined in claim 1, wherein said at least one position transducer positioned in said housing is influenced by means of the displacement of said push rod extending through a housing wall and actuated by said fluid actuation system.

3. A control system as defined by claim 2, for use in an anti-skid regulating system.

4. A control system as defined by claim 1, wherein said at least one position transducer positioned in said housing is influenced by means of a movement of a magnet disposed outside said housing connected with said fluid actuation system.

5. A control system as defined by claim 4, for use in an anti-skid regulating system.

6. A control system as defined by claim 1, for use in and anti-skid regulating system.

7. A control system containing at least one position transducer, an electronic evaluation circuit for the transducer signals and at least one electromagnetic valve having an electromagnetic portion and a valve element portion which is triggered by said electronic evaluation circuit and is incorporated into a fluid actuation system, wherein said evaluation circuit is disposed in the vicinity of said electromagnetic valve, the improvement comprising a common housing for supporting said evaluation circuit and said electromagnetic portion of said at least one electromagnetic valve being accommodated in a valve block means separate from said housing, said common housing being mounted on said valve block means, said valve element portion of said at least one electromagnetic valve being actuatable via at least one push rod extending from said common housing, and said at least one push rod being displaceable by said electromagnetic portion of said electromagnetic valve, said common housing comprises a base body, in particular of metal, with which said common housing is mounted onto said valve block means and on which the electromagnetic portion of said at least one electromagnetic valve and said at least one position transducer are secured, and said base body comprises carrier ribs for securing said evaluation circuit embodied as a hybrid module.

8. A control system as defined in claim 7, for use in an anti-skid regulating system.

9. A control system containing at least one position transducer, an electronic evaluation circuit for the transducer signals and at least one electromagnetic valve having an electromagnetic portion and a valve element portion which is triggered by said electronic evaluation circuit and is incorporated into a fluid actuation system, wherein said evaluation circuit is disposed in the vicinity of said electromagnetic valve, the improvement comprising a common housing for supporting said evaluation circuit and said electromagnetic portion of said at least one electromagnetic valve, said valve element portion of said at least one electromagnetic valve being accommodated in a valve block means separate from said housing, said common housing being mounted on said valve block means, said valve element portion of said at least one electromagnetic valve being actuatable via at least one push rod extending from said common housing, said at least one push rod being displaceable by said electromagnetic portion of said electromagnetic valve, said housing comprises a base body, in particular of metal, with which said common housing is mounted onto said valve block means and on which the electromagnetic portion of said at least one electromagnetic valve and said at least one transducer are secured, at least one printed circuit board for connecting said at least one transducer, said evaluation circuit, said electromagnetic portion of said at least one electromagnetic valve, and a plug connector is secured on said base body, and said base body comprises carrier ribs for securing said evaluation circuit embodied as a hybrid module.

10. A control system as defined by claim 9, for use in an anti-skid regulating system.

* * * * *